United States Patent [19]

Denker et al.

[11] Patent Number: 4,970,936
[45] Date of Patent: Nov. 20, 1990

[54] GAS RESERVOIR ACTUATION DEVICE

[75] Inventors: Russell E. Denker; Donald P. Williams, both of Tucson, Ariz.

[73] Assignee: Hughes Aircraft Company, Los Angeles, Calif.

[21] Appl. No.: 274,064

[22] Filed: Nov. 21, 1988

[51] Int. Cl.$^5$ .................... F42C 15/00; A62C 35/02; B67B 7/24
[52] U.S. Cl. ...................... 89/1.14; 169/28; 137/68.2; 220/261
[58] Field of Search ............... 60/632-638; 89/1.14; 169/28; 137/68.2; 220/261

[56] References Cited

U.S. PATENT DOCUMENTS

| | | | |
|---|---|---|---|
| 1,933,694 | 11/1933 | Allen et al. | 89/1.14 |
| 2,947,315 | 8/1960 | Connell | 220/261 |
| 2,972,998 | 2/1961 | Detwiler | 220/261 |
| 2,997,051 | 8/1961 | Williams | 220/261 |
| 3,027,903 | 4/1962 | Thorp | 220/261 |
| 3,101,733 | 8/1963 | Lord | 220/261 |
| 3,111,133 | 11/1963 | Fulton et al. | 220/261 |
| 3,349,786 | 10/1967 | Martin | 220/261 |
| 3,853,180 | 12/1974 | Harris et al. | 169/28 |
| 3,913,604 | 10/1975 | Hanson et al. | 137/68.2 |
| 4,188,856 | 2/1980 | Bendler et al. | 169/28 |

*Primary Examiner*—David H. Brown
*Attorney, Agent, or Firm*—Randall M. Heald; Robert A. Hays; Wanda K. Denson-Low

[57] ABSTRACT

A container of a pressurized gas has an elongated inlet/outlet tubular neck which extends into a housing passage. A cap sealed over the inlet/outlet neck has a platelike member connected to the neck via a hollow support or column. A piston is slidingly received within the housing passage for movement toward the platelike member and has a rod which can be brought into contact with the member eccentrically of the hollow support. A squib on being discharged driving the piston toward the platelike member and rod cantilevers about the hollow support causing it to break and release the gas for use.

7 Claims, 2 Drawing Sheets

GAS RESERVOIR ACTUATION DEVICE

BACKGROUND OF THE INVENTION

1. Field of the Invention

The present invention relates to a device for releasing pressurized gas from a reservoir.

2. Description of Related Art

There are a number of situations such as in a missile, for example, in which the energy of a compressed gas stored in a reservoir is utilized for powering other apparatus. A device for releasing the pressurized gas must operate reliably, quickly and not have its operation impaired by extended storage.

One approach is to use a valve interrelating the reservoir to the point of use by actuating the valve electrically, for example. Although such devices would function well, they are relatively complex and expensive to manufacture and for those reasons alone they may be precluded from general use as not being cost effective. Also, in certain cases if the valve were exposed to the pressurized gas for an extended period during storage, there could be deterioration of the valve parts resulting in reduced reliability, or, undesirable leakage.

Another well-known present day device for accomplishing rapid release of gas from a gas reservoir is referred to generally as a "ruptured disk and cutter" device. More particularly, these devices have a thin rupturable metal disk which covers an exit opening of the reservoir. Spaced slightly from the disk or membrane is a piston assembly having a cutter end. In operation, an explosive device (e.g., squib) upon being ignited causes the piston to travel rapidly toward the disk and the cutter end of the piston ruptures the disk to allow the gas in the reservoir to escape. This device possesses a disadvantage of being complex and expensive to manufacture, particularly in that the piston and its cutter end require relatively expensive machining operations for fabrication.

A second available actuation device can be generally referred to as a "frangible top and piston" device in which a reservoir outlet is sealed off by a frangible cover which extends outwardly therefrom. A piston located for movement transversely of the frangible cover is caused to move by the explosion of a squib. The piston strikes the side of the frangible cover and breaks it to release the stored gas. This device is also objectionable for cost in that it requires the boring or drilling of two passages at 90 degrees to one another, one for the piston and the other for the frangible cover.

SUMMARY OF THE INVENTION

A gas reservoir with which we are especially concerned here includes a containing portion with a threaded inlet/outlet neck extending outwardly thereof. Threaded onto the reservoir neck is a cover cap having a contact plate facing outwardly from the end of the neck and unitarily connected to the remaining cap body by a hollow, thin-walled support. The support is axially aligned with the reservoir neck and the contact plate major surface. The cap plate and support are constructed of a relatively brittle frangible material.

A housing (e.g., wall member) for receiving the device described includes a single elongated passage threaded at both outer ends, one end to receive the frangible cap and gas reservoir. A cylindrical piston having a circumferentially extending groove with an O-ring therein is slidingly received within the opposite end of the housing passage. On a front surface of the piston facing toward the reservoir cap, there is mounted a pin extending longitudinally away from the piston surface and arranged as to align with the cap contact plate eccentrically of the cap support. An electrically energizable squib is also threaded into the housing passage just outwardly of the piston.

In operation, when the squib is energized, high pressure gas from the explosion drives the piston forward engaging the piston pin with the cap plate which because of the eccentric force application breaks the support releasing the reservoir gas.

DESCRIPTION OF A PREFERRED EMBODIMENT

There are many situations in which it is convenient or desirable to operate equipment by utilizing the energy of a stored quantity of pressurized gas. Directional control or course correction of a missile is but one example. Although valving apparatus can be used to release the pressurized gas, such apparatus is relatively complex and expensive for many purposes, especially where the apparatus is only to be used once as on board a missile, for example. Instead, an approach generally favored at this time is to seal a pressurized gas within a container or reservoir, and when the gas is needed break the seal by an explosive device releasing the gas to perform the desired work.

Figure 1:
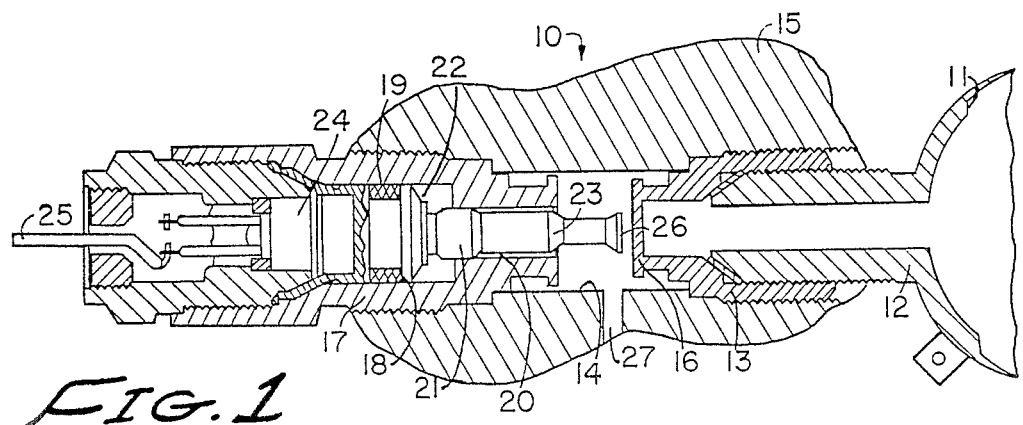
FIG. 1 is a sectional, elevational view of a prior art reservoir actuation device.

Reference is now made to FIG. 1 of the drawing showing one known prior art gas reservoir actuation device enumerated as 10. A quantity of pressurized gas is stored in a container or reservoir 11 having an elongated neck 12 which serves as both inlet for filling the vessel as well as an outlet through which the pressurized gas moves for ultimate use. The neck 12 is threaded on its outer surface for receiving a similarly threaded cap 13 to close off the outer end of the neck and contain the pressurized gas within the reservoir. The cap 13 also has external threads permitting threaded receipt within an end of an elongated passage 14 in a housing, wall member or other rigid structure 15. The cap inner end includes a membrane 16 having a major surface extending transversely of the passage and located along the passage longitudinal axis.

A piston cylinder or chamber 17 has threads 18 on its exterior surface and is of such cross-sectional dimensions as to enable threaded receipt within the opposite end of passage 14 and facing toward the cap 13. Chamber 17 includes a first bore opening 19 axially aligned with passage 14 which communicates with a second smaller cross-sectional area bore opening 20, the latter opening into the interior of the passage 14. A piston 21 slidingly received within the chamber 17 has a first part 22 dimensioned for receipt within the bore opening 19 and a second part 23 for location within opening 20.

The piston parts 22 and 23 are unitarily interconnected so as to move axially along the bore openings together as a single element. The innermost end of the piston 21 faces directly toward the cap membrane 16 and is centered thereon. The piston terminus has a sharp cutting edge which on movement of the piston towards the cap can be brought into direct contact with the membrane 15.

An electrically energized explosive device or squib 24 of conventional construction is threaded into the outer end of the piston chamber 17. In operation, when the squib 24 is ignited by an electric current supplied to cable wires 25, the high pressure gases released upon explosion drive the piston 21 forward bringing the sharp front edge 26 into contact with the cap membrane 15 and piercing it and allowing the gas to escape from the reservoir 10 to a point of use along passageway 27. Although this known reservoir actuation device operates satisfactorily, it is relatively complex and expensive to manufacture especially in that it requires machining of the piston into two different dimensional parts for moving in the two different diameter bore openings 19 and 20.

Figure 2:
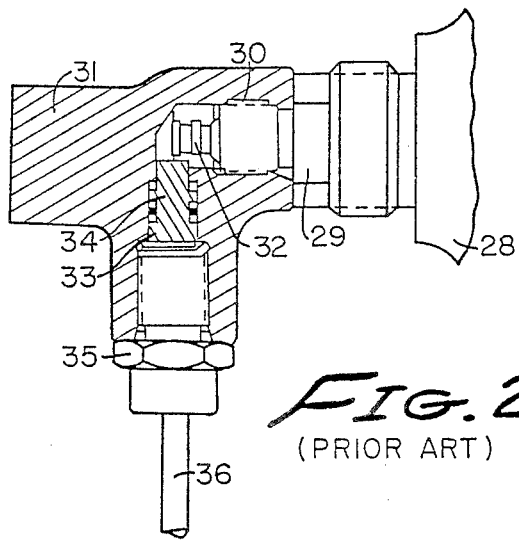
FIG. 2 is a sectional, elevational view of a further prior art reservoir actuation device.

FIG. 2 depicts another known reservoir actuation device in which the pressurized gas reservoir 28 includes a unitary inlet/outlet tube 29 threaded within a first passageway 30 of a housing 31. The internal end of the tube 29 is closed off by a generally cylindrically cap 32 constructed of a frangible material. A second passageway 33 intercepts the first passageway 30 at substantially 90 degrees thereby forming an overall L-shaped chamber. A movable piston 34 located in the passageway 33 can be moved inwardly to a point where it contacts the end portion of frangible cap 32. As in the first described prior art embodiment, a squib 35 is threaded into the outer end of passageway 33 and is energizable by electric current through a cable 36 for firing. On the squib exploding, the high pressure gases formed drive the piston 34 upward into contact with cap 32 causing it to break and release the pressurized gas contained in reservoir 27.

The FIG. 2 device operates satisfactorily, however, it is subject to several difficulties. First of all, the device takes more space than is desirable by having two passageways at 90 degrees to each other. Also, when compared to the FIG. 1 version, it is necessary to drill or bore two passageways as compared to one, which is an added manufacturing expense.

Figure 3:
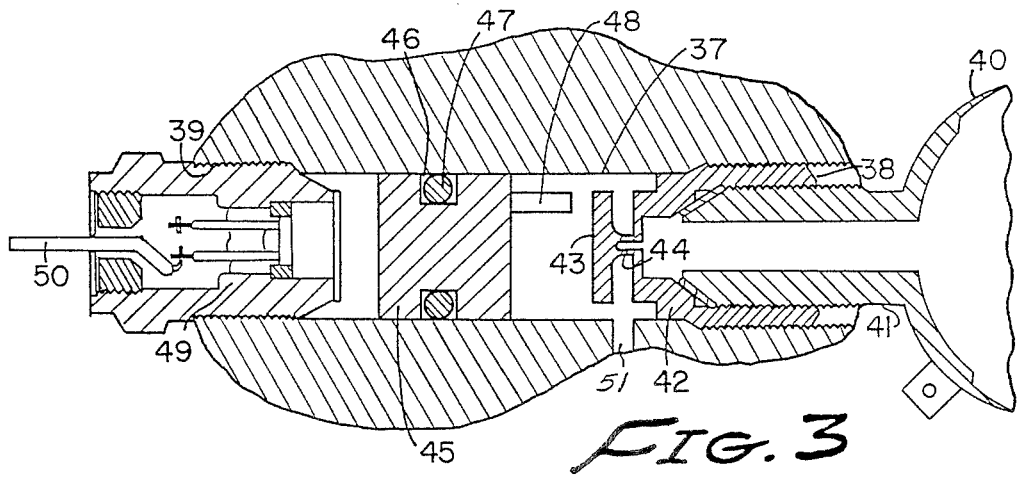
FIG. 3 is a sectional, elevational view of the device of this invention.
Figure 4:
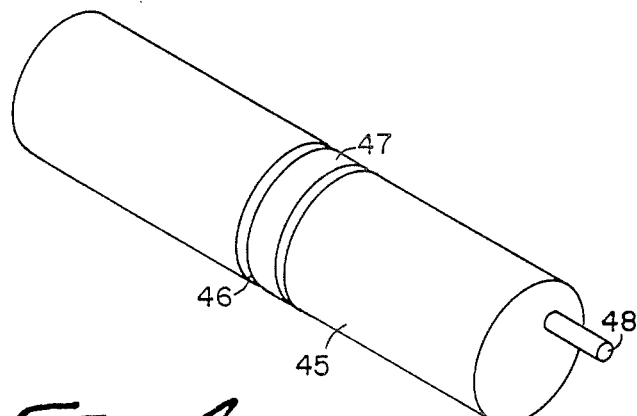
FIG. 4 is a perspective, partially sectional view of the drive piston for use with the FIG. 3 device.
Figure 5:
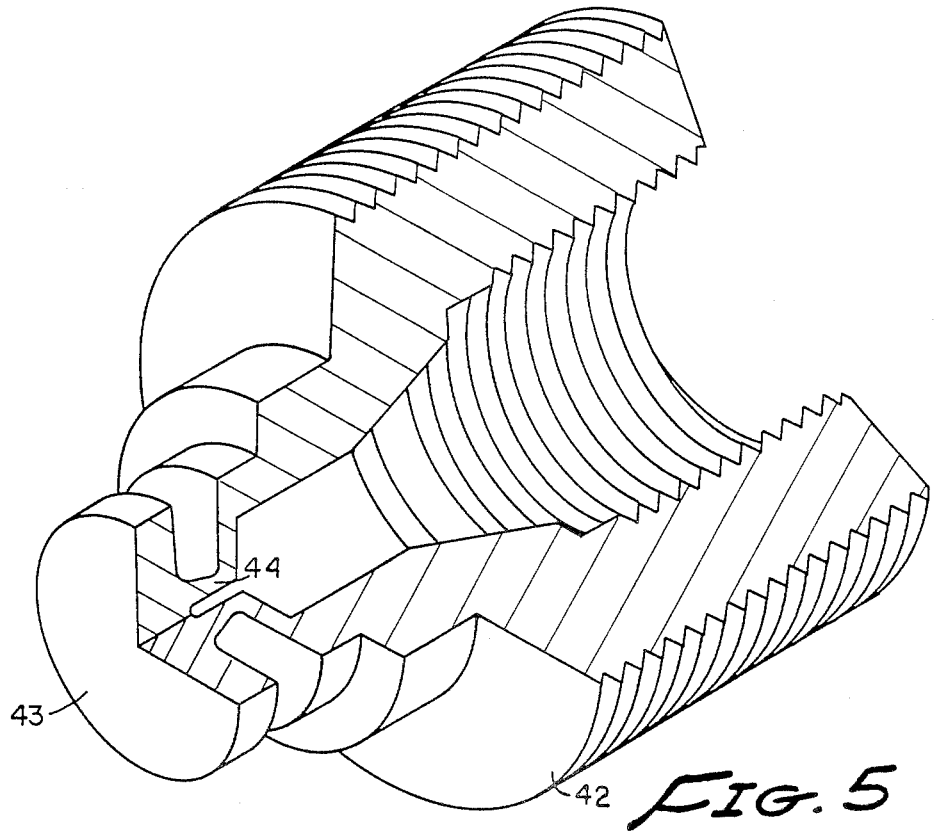
FIG. 5 is a perspective, sectional, partially fragmentary view of a frangible cap used in the FIG. 3 device.

For the ensuing description of the detailed aspects of the present invention, reference is now made to FIGS. 3 through 5. For accommodating the described reservoir actuation device, a single linear passageway 37 is formed in a housing, wall member or other rigid supporting structure with the internal end portions 38 and 39, respectively, being threaded. A pressurized gas reservoir 40 of conventional construction and including an elongated inlet/outlet neck or tube 41 can be identical to the reservoir 10 and its inlet/outlet neck 11 as shown in FIG. 1.

A cap 42 constructed of a relatively frangible material is generally cylindrical in construction having an internal thread on one open end for receipt onto the threaded end of the reservoir neck 41. Also, the outer end surface of the cap is threaded for receipt within the similarly threaded open end of the passageway 37. The inner end of cap 42 is closed-off to prevent gas escaping from the reservoir via the neck and includes a generally disk-like plate 43 held spaced from the remainder of the cap by a hollow tubular support 44 extending along the longitudinal axis of the passageway 37. More particularly, the support 44 has a hollow interior communicating with the interior of the neck and thus the reservoir. The support sidewalls are relatively thin and can be readily broken. The support holds the plate 43 with its major surface extending transversely of the passageway 37 and with the major surface center generally aligned with the passageway longitudinal axis.

From the opposite end of the passageway 37 a cylindrical piston 45 having flat front and rear faces is slidingly received within the passageway, and a circumferential groove 46 on the piston contains an O-ring 47 which seals the piston outer surface of the piston against gas and moisture moving therepast. A rod 48 has one end affixed to the piston flat face so that the rod extends away from the piston toward the reservoir cap. More particularly, the rod 48 is located off the longitudinal axis of the passageway 37 so that movement of the piston 45 along the passageway can bring the end of the rod 48 into contact with the plate 43 at a point eccentrically of the support 44.

A squib 49 of conventional construction is threaded into the passageway end and is energizable by an electric current being provided along cable 50.

On energizing the squib 49 explosion gases force the piston 45 along the passageway 37 until the end of rod 48 strikes the plate 43. Since the striking force exerted on the plate is eccentric to the support 44 this twists the plate causing the support to break releasing the pressurized gas which travels along opening 51 for ultimate use.

It is important to note that in assembly the piston 45 does not require any particular angular orientation within the passageway 37. Since the rod 48 is eccentric to the passageway 37 longitudinal axis, any angular position of the piston within the passageway will result in a fully operative device.

Still further, only a single passageway 37 must be formed in the housing as compared with two passages at 90 degrees to each other for the FIG. 2 prior art. Manufacture of a cylindrical piston having a single circumferential groove with O-ring is far easier and less expensive than the piston shown in FIG. 1.

One satisfactory material which has been used in a practical construction of the frangible cap 42 is steel 17-4PH which has been heat treated to condition H 1025.

What is claimed is:

1. A device for releasing pressurized gas from a reservoir, which reservoir has an open-ended inlet/outlet tubular neck, comprising:

a cap sealed over the open end of the tubular neck, said cap having a platelike member the central part of which is mounted on a hollow support, with portions of the platelike member extending transversely throughout 360 degrees of the support mounting point;

a piston constrained for movement in a path toward and away from a major surface of the platelike member;

means affixed to the piston and extending away from the piston toward the platelike member for contacting the platelike member at a point transversely spaced from the hollow support; and explosive means for driving the piston along said path bringing the contacting means into contact with the platelike member, breaking the hollow support and releasing the gas.

2. A device as in claim 1, in which the contacting means is a rod, one end of which is affixed to the piston and the opposite end extends forwardly of the piston to contact the cap on ignition of the explosive means.

3. A device as in claim 1, in which the explosive means is an electrically triggered squib.

4. A device as in claim 1, in which the piston, explosive means and cap are located within a linear passageway of a housing.

5. A device as in claim 4, in which the cap is hollow and generally cylindrically with the platelike member being circular and its major surface arranged transversely of the passageway, said support being elongated with one end unitarily connected to the platelike member at substantially the center of a major surface thereof.

6. A device as in claim 4, in which the piston is cylindrical with a circumferential groove and an O-ring received in said groove, the passageway being cylindrical and so dimensioned as to slidingly receive the piston therewithin.

7. A device as in claim 6, in which the cap is hollow and generally cylindrical with the platelike member being circular and its major surface arranged transversely of the passageway, said support being elongated with one end unitarily connected to the platelike member at substantially the center of a major surface thereof.

* * * * *